United States Patent Office 3,463,668 Patented Aug. 26, 1969

3,463,668
INHIBITED STARCH PRODUCTS
Raymond B. Evans, Catonsville, Md., and Leo H. Kruger, Kendall Park, and Chester D. Szymanski, Martinsville, N.J., assignors to National Starch and Chemical Corporation, New York, N.Y., a corporation of Delaware
No Drawing. Filed Sept. 21, 1966, Ser. No. 580,884
Int. Cl. C13l 1/08; C08b 19/04, 25/02
U.S. Cl. 127—32    8 Claims

ABSTRACT OF THE DISCLOSURE

Inhibited, granular starch products possessing labile cross-linkages are prepared by reacting a granular starch base with a combination of: (1) either glycine or a glycine progenitor; and (2) a chlorine containing oxidizing agent at controlled pH and temperature levels.

---

This invention relates to a novel method for the inhibition of granular starch products and, particularly, to the inhibited starch products thereby prepared.

In our use of the term "inhibited starch," we refer to a starch in which the disintegration of the starch granules is retarded under conditions whereby the intact starch granules would ordinarily swell and burst. Thus, inhibited starches exhibit a markedly reduced tendency to gelatinize and also display a comparatively short, noncohesive consistency after cooking. The degree of inhibition can often be controlled and varied over a wide range so as to produce starch products in which the swelling of the granules is only slightly retarded or inhibited so that they cannot remain suspended in water but will, rather, settle out as a separate phase.

Starch may be inhibited, while in granular form, by reaction with polyfunctional reagents, such as diepoxides and dianhydrides, etc., which cross-link the starch molecules within the granule. This reaction results in the formation of covalent chemical linkages between the molecules, thereby adding to the bonding forces which hold the granule together. This increase in the strength of the cohesive forces in the granule thus results in the need for a greater energy requirement in order to disrupt the granule upon cooking such inhibited starches in water.

Inhibited granular starches are desired for various industrial uses. They are particularly useful in applications where the cohesiveness and stringiness of some native starches are found to be objectionable. Thus, for example, in the food industry starch products which on cooking yield short, smooth pastes are used as thickening agents in pies, sauces, and soups, etc.

It is often advantageous that the cross-linkages which are introduced into inhibited starch products should be labile, i.e., they should be destructible. Among the methods for destroying or eliminating these cross-linkages are treatments of the inhibited starches with heat, bases, or salts, etc. Thus, inhibited starches may be prepared so as to initially yield thin, workable pastes which, on further treatment, are divested of their cross-linkages so as to swell and ultimately burst their intact granules in order to produce heavier, more viscous products.

It is the object of this invention first to provide a novel method for the preparation of inhibited starch products. It is a further object to prepare inhibited starch products containing cross-linkages whose presence permits these products to exhibit normal but latent swelling characteristics, the cross-linkages being labile such as to permit their being controllably and readily destroyed or eliminated. Various other objects and advantages of this invention will become apparent from the following description thereof.

Thus, we have now found that by reacting granular starch bases with a combination of: (1) either glycine or a glycine progenitor; and (2) a chlorine containing oxidizing agent at controlled temperatures and pH levels, we may prepare novel inhibited granular starch products wherein the resulting cross-linkages are labile and which thereby provide these inhibited granular starch products with the unique ability to be subsequently controllably and readily converted into completely swollen products.

The applicable starch base materials which may be used in preparing our novel starch products must be in intact granule form. They may be derived from any plant source including corn, potato, sweet potato, wheat, rice, sago, tapioca, waxy maize, sorghum, high amylose corn or the like. Also applicable are the conversion products derived from any of the latter bases including, for example, dextrines prepared by the hydrolytic action of acid and/or heat; oxidized starches prepared by treatments with oxidants such as sodium hypochlorite; and, fluidity or thin boiling starches prepared by enzyme conversion or by mild acid hydrolysis. It is also possible, in our process, to employ any substituted ether or ester derivative of the latter starch bases, provided that such ester or other derivatives still retain free hydroxyl groups which are available for further reaction. Our use of the term "starch base" is thus seen to include any amylaceous substance, whether untreated or chemically modified, which are in granule form and which still retain free hydroxyl groups capable of entering into the cross-linking reactions utilized in the process of this invention.

With regard to the class of glycine progenitors which are applicable for use in our process, they are all selected from the group consisting of glycine and glycine progenitors, i.e., compounds which can form glycine under the conditions of the inhibition reaction. It is thus seen that all of the applicable glycine compounds will contain at least one of the following functional groups:

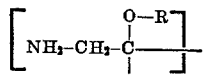

and

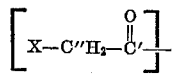

wherein R represents a labile group such as hydrogen or an alkyl ester group whose linkage to the oxygen atom is readily broken under the conditons encountered during the course of the inhibition reaction employed in the process of this invention and wherein X is selected from the group consisting of $NH_2$ and

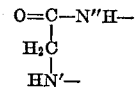

wherein, in the latter formula, nitrogen atom N' is linked to carbon atom C' and nitrogen atom N" is linked to carbon atom C". Specific examples of such compounds include: glycine, glycine anhydride (diketopiperazine), ethanol amine, 1 - amino - 2 - hydroxypropane, glycine amides, glycine esters such as glycine ethyl ester, aminoacetone, glycine di- and tripeptides, and glycine terminated polypepetides such as glycylglycine.

It should be noted that gelatin which has been hydrolyzed, as with concentrated acid, prior to its use in the reaction system of our process, contains approximately 20%, by weight, of glycine and thus may also be used as a glycine progenitor in the process of this invention. The use of the hydrolyzed gelatin, as opposed to untreated gelatin, is essential in order to obtain starch products exhibiting adequate amounts of inhibition as well as the resulting labile cross-linkages.

In referring to the chlorine containing oxidizing agents which are applicable for use in the process of this invention, we specifically contemplate the use of hypochlorite compounds such as sodium hypochlorite, potassium hypochlorite, and calcium hypochlorite as well as compounds which are converted into hypochlorites under the conditions of the inhibition reaction such, for example, as chlorine gas; chloroamines such as $NH_2Cl$, $NHCl_2$, $NCl_3$ and N-butyl chloroamine; and, N-chloro compounds such as N-chlorosuccinimide and N-chloroacetamide.

It should be noted that, in an aqueous medium, N-chlorosuccinimide may be used as the sole reagent in the inhibition reaction with starch. However, the use of the above described combination of reagents, i.e., of a chlorine-containing oxidizing agent and glycine or a glycine progenitor, is found to provide the practitioner with more effective results with respect to the nature of the resulting inhibited starch products.

In general, the novel process of this invention comprises the initial step of admixing an aqueous suspension of the specified starch base with an aqueous solution of the selected glycine progenitor and thereupon adding an aqueous solution of a hypochlorite compound to the resulting mixture. The hypochlorite solution is added dropwise, with agitation, to the starch-glycine progenitor mixture over a period which may extend up to about two hours, there being no obvious advantage to any further extension of the addition period. It should be noted, however, that if desired by the practitioner both the glycine progenitor and the hypochlorite compound may be added to an aqueous starch suspension system in solid form.

The reaction is carried out at temperatures ranging from about 32° to 140° F. and preferably from about 70° to 90° F., the use of temperatures exceeding about 140° F. being undesirable because of the granule swelling and filtration difficulties which result from the use of such elevated temperatures. The pH level of the system may range from about 5 to 11 but it is preferable to maintain it at a level of 8 to 10. The maintenance of the latter pH levels is required since extremely acid systems, i.e., pH levels lower than about 5, serve to retard the inhibition reaction while extremely basic systems, i.e., pH levels in excess of about 11, enable the chlorine to degrade the starch base. In most instances, the maintenance of the proper pH level is assured by virtue of the presence of free caustic in the hypochlorite solution, the concentration of free caustic being kept below about 3.5%, as based on the total weight of hypochlorite solution, in order to avoid swelling of the starch granule.

After completion of the hypochlorite addition step, the system is maintained, under agitation, at the preferred pH level and temperature for a period of up to about 16 hours; the inhibition reaction being capable of occurring almost instantaneously. The active chlorine remaining in the system is thereupon destroyed by the addition of an antichlor such as hydrogen peroxide or sodium bisulfite. The suspension is then adjusted to a pH level of from about 3 to 7, and preferably to a pH level of 5, by the addition of dilute acid and the resulting reaction product thereupon filtered, washed and finally dried.

If desired, the sequence of steps in the above described procedure may be varied. Thus, individual solutions, suspensions, or solids of the glycine progenitor as well as of the hypochlorite compound may be simultaneously added to the starch suspension. In addition, a solution containing a mixture of a glycine progenitor and a hypochlorite compound may be added to the aqueous starch suspension or, perhaps, a solution of hypochlorite compound may be added to the starch suspension prior to the addition of the glycine progenitor. These variations do, however, raise such problems as decreased efficiency, reduced levels of inhibition, and increased starch degradation, thereby making the initially described technique, which is free from these problems, the preferred procedure for purposes of this invention.

With respect to proportions, the glycine or glycine progenitor should be present in the system in concentrations ranging from about 0.01 to 7.0%, by weight of the starch present therein, while the concentration of hypochlorite compound, expresed as percent active chlorine, should range from about 0.1 to 6.5%, as based on the weight of starch present. Furthermore, for most effective inhibition, the weight ratio of active chlorine to glycine should range from about 2:1 to 10:1. When this ratio falls sufficiently below 2:1, the degree of inhibition in the resulting starch product will be drastically reduced unless at least about 0.25%, by weight, of glycine is present in the system. In contrast, when the chlorine:glycine ratio exceeds about 10:1, the degradative effect of the chlorine upon the starch molecule is found to effectively compete with the inhibition reaction. Furthermore, when the ratio of chlorine:glycine falls to about 1:2, or below, there is essentially no inhibition reaction regardless of the total amount of glycine which is present in the system. In addition, the system should contain sufficient water so as to have a total solids content in the range of from about 10 to 90%, by weight.

In all cases, the intact granular starch products resulting from the process of this invention are assumed to be inhibited by the formation of one cross-link for each available

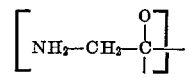

or

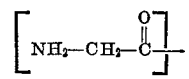

functional group. As previously mentioned, these cross-linkages may be easily or readily destroyed as a result of their sensitivity to heat, alkali, and salts such as sodium iodide. Thus, our novel derivatives are characterized by their ability to initially yield thin, low viscosity dispersions which may be subsequently thickened by the destruction of their cross-linkages thereby leading to the further swelling and possible rupture of their granules.

Our inhibited, granular starch products may show varying degrees of inhibition depending upon the extent of the reaction and the consequent number of resulting cross-linkages. The amount of granule inhibition may be determined by measuring the granule swelling power (GSP) of the resulting cross-linked starch, although viscosity measurements and sediment volume tests may also be utilized for this purpose. Granule swelling power is a measure of the extent of granule inhibition and may be defined as the mount of swollen, hydrated paste which is formed by the cooking, in water under specific conditions, of one gram of dry starch as divided by the weight of anhydrous starch in the swollen paste. It may thus be observed that starch products exhibiting greater inhibition will have lower GSP values in comparison to the base starch from which they are derived.

The GSP is determined, in practice, by dispersing one gram of starch (anhydrous weight) in enough distilled water to give a total weight of 100 grams. Normally, the starch is suspended in this water, stirred over a boiling water bath for five minutes, and then covered for the remaining 55 minutes of the cooking cycle. After cooking is complete, the sample is readjusted to a weight of 100 grams and transferred, quantitatively, into graduated 100 ml. centrifuge cups. The sample is then centrifuged at 2000 r.p.m. for exactly 20 minutes and the starch dispersion is separated as a clear supernate and a compacted swollen paste. The percent solids in the supernate is determined by evaporation of an aliquot. The wet weight of the swollen paste is determined directly after decantation of the supernate and the amount of dry solids in the paste is determined by evaporation. The granule swelling power is then calculated by the formula:

$$GSP = \frac{\text{Wet weight of swollen paste}}{\text{Weight of dry starch in swollen paste}}$$

As previously noted, the viscosity of the cooked pastes derived from our novel starch products may also be used to determine their inhibition characteristics. A Brabender Viscograph is typical of the apparatus usually utilized to make such viscosity determinations. This instrument traces a continuous graphic record of the viscosity of the test sample, thereby providing viscosity data during the heating, holding and cooling cycles. Thus, for example, uninhibited starch products will exhibit relatively high peak viscosities during the heating cycle and relatively large viscosity decreases during a holding cycle, e.g., when maintained for 30 minutes at 95° C. Furthermore, lightly inhibited starches also exhibit high peak viscosities but do not show the marked viscosity decrease during the holding period which is indicative of the uninhibited starch product. On the other hand, moderately inhibited products do not exhibit any peak viscosities but do undergo viscosity increases during the holding period.

The lability of the heat sensitive cross-linkages resulting from the process of this invention may also be determined in the above described apparatus. Thus, rupturing of the cross-linkages during the extended heating of moderately inhibited starches is usually indicated by an increase in viscosity during this extended holding period. It should be noted that at 95° C. slight viscosity increases may, nevertheless, be observed as a result of the starch granules being ruptured by the mechanical energy of stirring. Those starch products containing heat sensitive cross-linkages will, however, show a much more rapid and distinct viscosity increase during this period.

Because of their unique combination of properties, the products of this invention can be utilized in many applications. Thus, in the food industry they may be used as thickening agents for pies, sauces and soups, etc. They are of particular interest in the canning industry as a result of their unique reaction during retorting, i.e., pressure cooking. In this procedure, the starch cross-linkages of our novel products are initially intact and the starch is in a thin state, thereby enabling the heat utilized for sterilization to rapidly penetrate the can and its contents. The continued application of the heat subsequently serves to destroy the cross-linkages of the inhibited starch thickeners thereby activating their delayed thickening properties. These starch products may also be used as temporary suspending agents and in various sizing, coating and adhesive applications.

It should be noted that although the propeties of the inhibited starch products of this invention are known, it is not, as yet, possible to precisely determine their actual physical structure inasmuch as they do not readily lend themselves to characterization by means of presently available analytical techniques.

The following examples will further illustrate the embodiment of our invention. In these examples, all parts given are by weight unless otherwise noted.

EXAMPLE I

This example illustrates the use of the novel process of this invention for the preparation of inhibited starch products. It further illustrates the manner in which the degree of inhibition of the resulting novel products is determined.

A reaction vessel fitted with a means for mechanical agitation was charged with a suspension of 400 parts of a waxy maize starch in 700 parts of water. While the suspension was under agitation, a solution containing 0.030%, by weight (i.e., 0.120 part), of glycine in 100 parts of water was added thereto. The pH of the resulting suspension was then adjusted to a level of 7.0 by the addition of portions of an aqueous sodium hydroxide solution. Thereupon, 25 parts of a 6%, by weight, aqueous sodium hypochlorite solution, which thus provided 0.375%, by weight (i.e., 1.5 parts), of active chlorine and 2.1% of excess alkali (NaOH), as based on the weight of the hypochlorite solution, was added dropwise to the suspension over a period of 40 minutes. During this addition step, the suspension was stirred continuously while the temperature of the system was maintained at 85° F. The pH level of the resulting system was 9.0.

After completion of the latter addition step, the mixture was stirred for another four hours whereupon the residual active chlorine was destroyed by the addition of 0.33 part of an aqueous solution containing 35%, by weight, of hydrogen peroxide. Agitation was continued for an additional hour, the resulting mixture then being acidified to a pH level of 3.5 by the addition of hydrochloric acid. After remaining at room temperature for a period of six hours, the pH level of the system was raised to 5.5 and the resulting product was thereupon filtered, thoroughly washed and dried. The GSP value of the inhibited starch was 18.2 as opposed to a value of 100 for the waxy maize starch base from which it was derived.

The inhibition of the resulting starch product was further evaluated by means of viscosity determinations conducted with a Brabender Viscograph. Thus, 23 parts of the above prepared inhibited starch product were admixed with 400 parts of water and the pH of the system djusted to 2.9 by the addition of 9 parts of acetic acid. Additional water was then added in order to give a total of 460 parts. The temperature of the system was then regulated according to the following sequence wherein the original temperature of 30° C. was increased at a rate of 1.5° C. per minute until a temperature of 95° C. was attained; the latter level being maintained for a period of 30 minutes whereupon the system was cooled down to 25° C. at a rate of 1.5° C. per minute. The viscosity, in Barbender Units (BU), was recorded on a continuous chart and was compared with another chart which reflected the viscosity characteristics of the base starch which, in this instance, was a waxy maize starch which had been submitted to a similar heat treatment.

As previously stated, inhibition of the starch products of this invention, under the stated conditions, is reflected by a low peak viscosity with higher viscosities being attained at the end of the heating and cooling cycles whereas the base starch yields a higher peak viscosity and substantially lower viscosities at the end of the heating and cooling cycles. Thus, the following viscosity readings were obtained by means of the above described procedure:

| Starch product | Peak viscosity (BU) | Viscosity (BU) after 30 minutes at 95° C. | Viscosity (BU) at 25° C. |
|---|---|---|---|
| Inhibited waxy maize | 620 | 470 | 710 |
| Waxy maize base | 1,100 | 30 | 30 |

The data summarized above clearly indicates the effective inhibition of the novel starch products resulting from the process of this invention.

The above described reaction procedures were then repeated, under identical conditions, with the exceptions that (1) diketopiperazine and ethanolamine were each, respectively, substituted for glycine, and (2) calcium hypochlorite and chlorine gas were each, respectively, substituted for sodium hypochlorite. The degree of inhibition of the resulting products was comparable to that of the inhibited waxy maize starch whose preparation was described hereinabove.

EXAMPLE II

This example illustrates the use of a variety of starch bases in the process of this invention. It also illustrates the high degree of inhibition of the resulting starch products.

(A) Utilizing the identical reaction procedure set forth in Example I, hereinabove, tapioca starch was subjected to the inhibition process of this invention.

The following table lists the concentrations of glycine and active chlorine which were utilized as well as the GSP and viscosity characteristics, as determined by the procedure set forth in Example I, of the resulting inhibited tapioca starches. The data presented in the table clearly indicates the effective inhibition which was achieved.

| Sample No. | Percent, by weight, active chlorine | Percent, by weight, glycine | GSP | Peak viscosity (BU) | Viscosity (BU) after 30 min. at 95° C. | Viscosity (BU) at 25° C. |
| --- | --- | --- | --- | --- | --- | --- |
| 1 | 0.375 | 0.031 | 24.2 | 357 | 182 | 350 |
| 2 | 0.160 | 0.030 | 22.7 | >700 | 318 | >700 |
| 3 | 0.250 | 0.050 | 18.4 | 565 | 340 | 630 |
| 4 | 6.5 | 7.0 | 9.7 | Highly inhibited-does not cook | | |
| 5 | 0.0 | 0.0 | 79.0 | 615 | 10 | 30 |

The reaction procedure described in Example I was then repeated, utilizing the concentrations of reagents set forth in Sample No. 1 in the above table, with the exception that hydroxypropylated tapioca (D.S.=0.1) was substituted for the tapioca starch. The inhibition of the resulting reaction products was comparable to that of the inhibited tapioca starch.

(B) A suspension containing 100 parts of potato starch in 150 parts of water was prepared. Thereafter, 0.1 part of glycine were added, under agitation, and the pH of the system was adjusted to 9.0 by the dropwise addition of a 3%, by weight, aqueous sodium hydroxide solution. 8.3 parts of a 6%, by weight, aqueous sodium hypochlorite solution, providing an equivalent of 0.5%, by weight, of active chlorine, were then added over a period of one hour while the system was maintained at a temperature of 75° F. and at a pH level of 9.0.

Upon cooking 6.6 parts of the resulting dried starch product in 100 parts of water, the dispersion thereby obtained was found to be very opaque and thin and it slowly settled out upon standing. These characteristics were all indicative of an inhibited product particularly upon comparison with raw potato starch which had undergone the same cooking treatment and was thereafter found to exhibit clear, heavy, cohesive characteristics.

The above described reaction procedure was then repeated, under identical conditions, with the exception that corn starch and bleached sago starch were each, respectively, substituted for the potato starch base. The effectiveness of inhibition of the resulting products was comparable to that of the product obtained when potato starch was employed.

It is thus seen that effective inhibition may be achieved by means of the process of this invention regardless of the starch base utilized for the reaction.

EXAMPLE III

This example illustrates the use of hydrolyzed gelatin as the glycine progenitor in the novel process of this invention. It further illustrates the necessity for utilizing gelatin which has, however, been hydrolyzed in order to obtain a substantially inhibited starch product.

The gelatin utilized in this procedure was initially hydrolyzed by admixing 5 parts of the gelatin with 50 parts of water and 50 parts of concentrated hydrochloric acid and, thereupon, subjecting the mixture, under agitation, to a temperature of 95° C. for a period of 6 hours.

Thereupon, 100 parts of waxy maize starch was admixed with 10 parts of the above described hydrolyzed gelatin solution (0.5 part of gelatin) along with 16.7 parts of a 6%, by weight, aqueous sodium hypochlorite solution (1.0 part of active chlorine) and the resulting system maintained at a temperature of 75° F. and a pH level of 9.0 for a period of 2 hours. The latter procedure was then repeated with the exception, in this instance, that unhydrolyzed gelatin was substituted for the hydrolyzed product.

A total of 7.5 parts of the dried starch product prepared using hydrolyzed gelatin was then cooked in 100 parts of water. The cook thus produced was found to be very opaque and thin and exhibited a tendency to settle out upon standing. These characteristics were all indicative of a substantially inhibited product particularly upon comparison with the starch product resulting from the procedure which utilized unhydrolyzed gelatin and which had also undergone the same cooking treatment and was thereafter found to exhibit extremely viscous characteristics.

EXAMPLE IV

This example illustrates the effect of varying reaction conditions on the inhibition procedure of this invention.

(A) Variation in the oxidizing agent.—The procedure set forth in Example I, hereinabove, was repeated with the exception that potassium periodate, sodium hypoiodite and sodium chlorite were each, respectively, substituted for sodium hypochlorite. In each case, no appreciable amount of inhibition was observed in the resulting products thus indicating the necessity for utilizing only the specified hypochlorite oxidizing agents which have previously been designated as applicable for use in the process of this invention.

(B) Variation in pH level.—The reaction procedure set forth in Example I was again repeated with the exceptions, in this instance, that (1) 0.26%, by weight, of glycine and 1.0%, by weight, of active chlorine were utilized in the reaction, and (2) the pH level of the system during the hypochlorite reaction was, respectively, adjusted to levels of 2.0, 5.0, 7.0, 9.0, and 11.0. The effectiveness of the inhibition in the resulting reaction products was found to conform to the following sequence of pH levels: 9>11>7>5>>>2. It is thus seen that effective inhibition can be achieved at pH levels ranging from about 5 to 11, although the most effective degree of inhibition is achieved at the preferred pH ranges of from about 8 to 10.

(C) Variation in the ratio of chlorine to glycine.—The procedures set forth in Example I were used to prepare and evaluate the inhibited starch products of this example wherein a variety of weight ratios of chlorine:glycine were utilized in the reaction. The weight ratios thus utilized are presented in the following table.

In performing the viscosity determinations, cooked systems containing 5%, by weight, of starch solids were maintained at a pH of 5. Under the latter conditions, the more inhibited products exhibited lower viscosities at the varying temperatures, as shown in the following table:

| Percent by weight, glycine | Percent, by weight, active chlorine | Weight ratio of chlorine: glycine | Viscosity (BU) at 95° C. | Viscosity (BU) at 30 min. at 95° C. | 25° C. |
| --- | --- | --- | --- | --- | --- |
| 0.10 | 0.00 | | 800 | 400 | 600 |
| 0.00 | 0.25 | | 870 | 980 | 1,360 |
| 0.05 | 0.25 | 5.0 | 20 | 80 | 200 |
| 0.10 | 0.25 | 2.5 | 20 | 110 | 220 |
| 0.15 | 0.25 | 1.7 | 50 | 270 | 470 |
| 0.20 | 0.25 | 1.25 | 70 | 300 | 500 |
| 0.25 | 0.25 | 1.0 | 160 | 610 | 840 |
| 0.30 | 0.25 | 0.83 | 800 | 980 | 1,360 |
| 0.50 | 0.25 | 0.5 | 1,120 | 1,040 | 1,400+ |

The data summarized above thus indicates that effective inhibition may be achieved when the chlorine:glycine ratio of the system exceeds a value of about 1.0, with optimum results being attained when it exceeds a value of about 2.0. The data also indicates the need, in the system, for the presence of both glycine and a hypochlorite compound in order to achieve the desired degree of inhibition in the resulting product.

EXAMPLE V

This example illustrates the lability of the cross-linkages of the inhibited starch products of this invention under conditions whereby the latter cross-linkages are exposed to an excess of heat, alkalinity, or various salts.

The labile nature of the cross-linkages was determined by submitting the specified starch products to the viscosity evaluation procedure described in Example I. The resulting reaction products were compared with epichlorohydrin inhibited starch products as well as with the raw starch bases from which they had been derived. The cross-linkages resulting from the epichlorohydrin inhibition are known to be exceedingly stable chemically and are not affected by the conditions of the testing procedure. Thus, any changes in their viscosity characteristics must be attributed to granule disruption rather than to any rupture of their cross-linkages.

(A) Effect of prolonged exposure to heat.—The starch products described in the following table were subjected to the Brabender viscosity determination at a pH of 5.0. In this instance, however, the system was held at 95° C. for a period of three hours and viscosity values thereupon taken at specific time intervals.

thereby decrease the inhibition of the resulting starch products.

Thus, 7.5 parts of the inhibited starch product whose preparation was described in Example I were suspended in an aqueous system containing 100 parts of water and 5 parts of the selected salt. The resulting suspensions, which were at a pH level of 5.0, were then cooked in a boiling water bath for a period of 30 minutes. Inhibition of the resulting systems, both with and without the salts, was evaluated by examining the texture and viscosity of the resulting cooled starch cook; the less inhibited systems, providing heavier pasty products.

The results of these evaluations are presented in the following table:

| Salt— | Viscosity of cooled cook |
|---|---|
| None | Thin. |
| Sodium iodide | Moderately heavy. |
| Sodium bromide | Moderate. |
| Sodium chloride | Moderate. |
| Sodium acetate | Moderate. |

The data summarized above clearly indicates the tendency of certain salts to destroy the glycine-chlorine cross-linkages present in the novel starch products resulting from the process of this invention.

| Starch Product | 95° C. | 15 min. at 95° C. | 30 min. at 95° C. | 1 hour at 95° C. | 2 hours at 95° C. | 3 hours at 95° C. | 25° C. | 15 min. at 25° C. | 30 min. at 25° C. |
|---|---|---|---|---|---|---|---|---|---|
| | | | | | Viscosity (BU) | | | | |
| Waxy maize inhibited with 0.03%, by weight, of glycine and 0.25%, by weight, of active chlorine according to the procedure set forth in Example I | 45 | 110 | 210 | 470 | 965 | 1,180 | 1,760 | 1,900 | 1,900 |
| Waxy maize inhibited with 0.05%, by weight, of epichlorohydrin according to the procedure described in Ex. I of U.S. Patent No. 2,500,950 | 90 | 160 | 210 | 320 | 520 | 735 | 1,135 | 1,205 | 1,205 |

The data summarized above clearly indicates that much of the cross-linking resulting from the glycine-chlorine treatment is disrupted upon exposing the resulting inhibited starch to excess heat. The latter effect is especially noted during the extended three hour heating period within the viscosity of the inhibited starch product of this invention showed a 1135 Brabender Unit increase as compared with only a 645 Brabender Unit increase for the epichlorohydrin inhibited starch.

(B) Effect of exposure to increased alkalinity.—The viscosities of the inhibited products described in part (A) of Example IV were determined at a variety of pH levels. The pH levels of the systems were varied by the addition, thereto, of small amounts of a dilute, aqueous sodium hydroxide solution. The results are presented in the following table:

Summarizing, this invention is seen to provide a unique method for the preparation of inhibited starch products characterized by their labile cross-linkages which, thereby, provide these products with the unique property of delayed and controllable granule swelling.

Variations may be made in proportions, procedures and materials without departing from the scope of this invention which is defined by the following claims.

We claim:

1. The starch inhibition reaction process for the preparation of inhibited, intact granule starch products comprising the steps of: (A) admixing and thereby reacting, under agitation, in an aqueous medium: (1) a starch base; (2) a glycine reagent containing as part of the molecule thereof, at least one functional group selected from the group consisting of the

| Starch Product | pH | At 95° C. | 15 min. at 95° C. | 30 min. at 95° C. | At 25° C. | 15 min. at 25° C. | 30 min. at 25° C. |
|---|---|---|---|---|---|---|---|
| | | | | Viscosity (BU) | | | |
| Epichlorohydrin inhibited. | 5.0 | 80 | 125 | 170 | 465 | 475 | 475 |
| | 10.0 | 70 | 95 | 110 | 310 | 310 | 320 |
| Glycine-chlorine inhibited. | 5.0 | 40 | 100 | 160 | 490 | 500 | 500 |
| | 6.0 | 50 | 90 | 140 | 410 | 420 | 420 |
| | 7.0 | 100 | 260 | 405 | 805 | 820 | 820 |
| | 8.0 | 500 | 680 | 745 | 1,265 | 1,330 | 1,340 |
| | 9.0 | 770 | 880 | 935 | 1,520 | 1,600 | 1,600 |

The destructive effect of increased alkalinity upon the labile cross-linkages of our novel starch products is clearly indicated by the data summarized above.

(C) Effect of exposure to various salts.—Since it was theorized that the cross-linkages present in the starch products resulting from the process of this invention would be destroyed by a "nucleophillic base displacement" reaction, tests were run in order to determine whether salts which participate in such reactions will also be capable of destroying the cross-linkages and

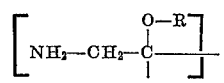

and

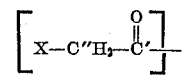

groups, wherein R represents a labile group whose linkage to the oxygen atom is readily broken in the inhibition reaction of the process and wherein X is selected from the group consisting of NH₂ and

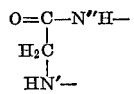

wherein, in the latter formula, nitrogen atom N' is linked to carbon atom C' and nitrogen atom N" is linked to carbon atom C"; and (3) a chlorine-containing oxidizing agent selected from the group consisting of hypochlorite compounds and compounds which convert into hypochlorites in the inhibition reaction of the process; wherein said glycine reagent is present in a concentration of from about 0.01 to 7.0% and the active chlorine in said chlorine-containing oxidizing agent is present in a concentration of from about 0.1 to 6.5%; the latter concentration ranges being based on the dry weight of the starch base; said chlorine-containing oxidizing agent being added stepwise, with agitation, to an aqueous mixture of said starch base and said glycine reagent; the reaction between said starch base, said glycine reagent and said chlorine-containing oxidizing agent being conducted at a pH of from about 5–11, at a temperature of from about 32–140° F. and for a period of up to about 16 hours subsequent to the completion of the addition of said chlorine-containing oxidizing agent to the aqueous mixture of said starch based and said glycine reagent; (B) removing any active chlorine remaining in the system; (C) adjusting the pH of the system to a level in the range of from about 3–7; and (D) recovering the inhibited, intact granule starch product by filtering the aqueous suspension resulting from step (C).

2. The process of claim 1, wherein R in the representation of the functional group of said glycine reagent is a radical selected from the group consisting of hydrogen and alkyl ester radicals.

3. The process of claim 1, wherein the weight ratio of the active chlorine in the chlorine-containing oxidizing agent to the glycine reagent exceeds about 1:2.

4. The process of claim 1, wherein said glycine reagent is glycine.

5. The process of claim 1, wherein said glycine reagent is hydrolyzed gelatin.

6. An inhibited, intact granule starch product characterized by its labile cross-linkages, said inhibited starch product comprising the inhibition reaction product of: (1) a starch base; (2) a glycine reagent containing as part of the molecule thereof, at least one functional group selected from the group consisting of the

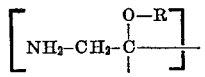

and

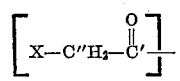

groups, wherein R represents a labile group whose linkage to the oxygen atom is readily broken in the inhibition reaction and wherein X is selected from the group consisting of NH₂ and

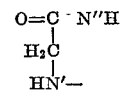

wherein, in the latter formula, nitrogen atom N' is linked to carbon atom C' and nitrogen atom N" is linked to carbon atom C"; and, (3) a chlorine-containing oxidizing agent selected from the group consisting of hydrochlorite compounds and compounds which convert into hypochlorites in the inhibition reaction; said reaction product being prepared under conditions wherein said glycine reagent is present in a concentration of from about 0.01 to 7.0% and the active chlorine in said chlorine-containing oxidizing agent is present in a concentration of from about 0.1 to 6.5%; the latter concentration ranges being based on the dry weight of the starch base, and wherein the weight ratio of the active chlorine in the chlorine-containing oxidizing agent to the glycine reagent exceeds about 2:1.

7. An inhibited, intact granule starch product characterized by its labile cross-linkages, said inhibited starch product comprising the reaction product of: (1) a starch base; (2) glycine; and (3) sodium hypochlorite; said reaction product being prepared under conditions wherein said glycine is present in a concentration of from about 0.01 to 7.0% and the active chlorine in said sodium hypochlorite is present in a concentration of from about 0.1 to 6.5%; the latter concentration ranges being based on the dry weight of the starch base, and wherein the weight ratio of the active chlorine in the sodium hypochlorite to the glycine exceeds about 2:1.

8. An inhibited, intact granule starch product characterized by its labile cross-linkages, said inhibited starch product comprising the reaction product of: (1) a starch base; (2) hydrolyzed gelatin; and (3) sodium hypochlorite; said reaction product being prepared under conditions wherein said hydrolyzed gelatin is present in a concentration of from about 0.01 to 7.0% and the active chlorine in said sodium hypochlorite is present in a concentration of from about 0.1 to 6.5%; the latter concentration ranges being based on the dry weight of the starch base, and wherein the weight ratio of the active chlorine in the sodium hypochlorite to the hydrolyzed gelatin exceeds about 2:1.

References Cited

UNITED STATES PATENTS

| 1,567,609 | 12/1925 | MacMillan | 127—33 |
| 1,802,867 | 4/1931 | Biddle | 106—130 X |
| 1,937,752 | 12/1933 | Fuller | 127—32 X |
| 1,942,544 | 1/1934 | Fuller II | 127—33 X |
| 2,668,169 | 2/1954 | Wolff | 260—233.3 |
| 2,989,521 | 6/1961 | Senti | 260—233.3 |
| 3,123,502 | 3/1964 | Henry | 127—70 |
| 3,135,738 | 6/1964 | Cushing | 127—70 X |
| 3,238,193 | 3/1966 | Tuschhoff | 260—233.3 X |
| 3,275,576 | 9/1966 | Flodin | 260—233.3 X |

MORRIS O. WOLK, Primary Examiner

SIDNEY MARANTZ, Assistant Examiner

U.S. Cl. X.R.

106—130; 127—33, 70; 260—233.3